(12) United States Patent
Kuo

(10) Patent No.: US 11,443,188 B2
(45) Date of Patent: Sep. 13, 2022

(54) APPLICATION GENERATION BASED ON NEURAL NETWORK

(71) Applicant: SONY GROUP CORPORATION, Tokyo (JP)

(72) Inventor: Jenke Wu Kuo, San Diego, CA (US)

(73) Assignee: SONY GROUP CORPORATION, Tokyo (JP)

(*) Notice: Subject to any disclaimer, the term of this patent is extended or adjusted under 35 U.S.C. 154(b) by 382 days.

(21) Appl. No.: 16/798,611

(22) Filed: Feb. 24, 2020

(65) Prior Publication Data
US 2021/0264249 A1   Aug. 26, 2021

(51) Int. Cl.
*G06F 9/44* (2018.01)
*G06N 3/08* (2006.01)
*G06F 8/76* (2018.01)
*G06F 8/30* (2018.01)
*G06N 3/04* (2006.01)

(52) U.S. Cl.
CPC ............... *G06N 3/08* (2013.01); *G06F 8/30* (2013.01); *G06F 8/76* (2013.01); *G06N 3/04* (2013.01)

(58) Field of Classification Search
None
See application file for complete search history.

(56) References Cited

U.S. PATENT DOCUMENTS

| 7,644,262 | B1* | 1/2010 | Bromley | G06F 9/44505 717/136 |
| 2016/0271493 | A1* | 9/2016 | Perlman | H04L 65/4015 |
| 2019/0173873 | A1* | 6/2019 | Brown | G06F 16/93 |

FOREIGN PATENT DOCUMENTS

WO    2018/136302 A1    7/2018

* cited by examiner

*Primary Examiner* — Qamrun Nahar
(74) *Attorney, Agent, or Firm* — Chip Law Group

(57) ABSTRACT

A server that includes circuitry and memory is provided. The memory stores a trained neural network model to provide a first application associated with a first service. The first application is executable on a first electronic device associated with first capability information. The circuitry receives, from a second electronic device, second capability information associated with the second electronic device. The circuitry further generates a second program code based on the received second capability information of the second electronic device and a first program code associated with first application. The circuitry further generates a second application associated with the first service based on the generated second program code. The circuitry further transmits the generated second application to the second electronic device. The generated second application may be executed on the second electronic device to provide the first service on the second electronic device.

20 Claims, 5 Drawing Sheets

APPLICATION GENERATION BASED ON NEURAL NETWORK

CROSS-REFERENCE TO RELATED APPLICATIONS/INCORPORATION BY REFERENCE

None.

FIELD

Various embodiments of the disclosure are related to application generation. More specifically, various embodiments of the disclosure are related to an apparatus and a method for application generation for electronic devices based on neural network model.

BACKGROUND

With the advancement of technology, there has been a proliferation of electronic devices. Various electronic devices associated with a particular user may include different capabilities or feature sets (for example related to display, audio, or accessibility functionalities). In certain situations, when the user changes usage of a particular service between different electronic devices, the change may disrupt or affect the user experience with the particular service due to mismatch in the capabilities of both the electronic devices, which may not be desired by the user in real-time. In certain situations, the user may seek manual support from an application developer to develop dedicated application for a target electronic device based on the capabilities. However, the manual development of the dedicated application may be time consuming and may not provide a real-time solution to the user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and a method for application generation based on neural network model, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus and a method for automated and real-time generation of an application based on a neural network model, for execution of a service on an electronic device. Exemplary aspects of the disclosure provide a server that may store a neural network model trained to provide a first application (for example, an audio/video playback application) associated with a first service (for example, a video streaming service). The first application, including a first program code, may be executable on a first electronic device (for example, a television or a mobile phone), which may be associated with a first capability (for example, hardware capability such as a particular screen size or a display resolution, or a software capability such as a particular operating system version or a display driver version). The server may be configured to receive second capability information from a second electronic device (i.e. new device different from the first electronic device), where the second capability information may indicate a capability (i.e. hardware or software) of the second electronic device. The server may further generate a second program code based on the received second capability information of the second electronic device and the first program code on which the neural network model is already trained. Based on the generated second program code, the server may generate a second application, which may be associated with the first service with which the first application executed on the first electronic device may also be associated. The server may further transmit the generated second application to the second electronic device for subsequent execution of the first service.

In the present disclosure, the server may automatically generate an application (i.e. the second application) that may be executable on an electronic device, based on a capability of the electronic device and a trained neural network model, in real-time. Such real-time and automatic generation of the application may enhance efficiency for the development of applications required for electronic devices with different or new capabilities, in comparison to convention solutions including manual development of applications. Further, the real-time and automatic generation of the application may provide seamless usage of the first service to a user even if the user changes their electronic devices with different capabilities or instructs their existing electronic device to provide the first service with limited capabilities or features.

Figure 1:
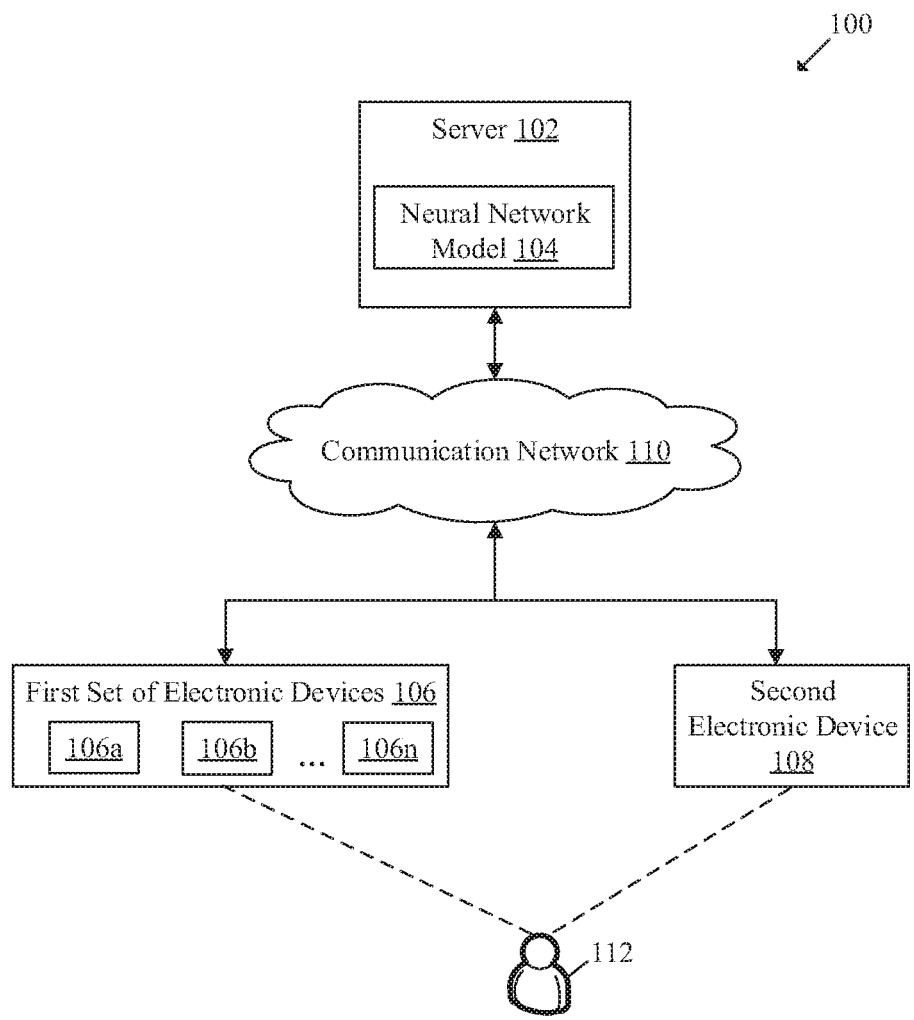
FIG. 1 is a block diagram that illustrates an exemplary network environment for application generation for electronic device based on neural network model, in accordance with an embodiment of the disclosure.

FIG. 1 is a block diagram that illustrates an exemplary network environment for neural network model based application generation for an electronic device, in accordance with an embodiment of the disclosure. With reference to FIG. 1, there is shown a network environment 100. The network environment 100 may include a server 102, a first set of electronic devices 106, a second electronic device 108, and a communication network 110. The server 102 may include a neural network model 104. The first set of electronic devices 106 may include at least one electronic device, such as, 106a, 106b . . . 106n. The server 102 may be coupled to the first set of electronic devices 106 and the second electronic device 108, via the communication network 110. There is further shown a user 112 who may be associated with the first set of electronic devices 106 and the second electronic device 108.

The "n" number of electronic devices in the first set of electronic devices 106 shown in FIG. 1 is presented merely as an example. The first set of electronic devices 106 may include only one electronic device or more than "n" electronic devices, without a deviation from scope of the disclosure.

The server 102 may comprise suitable logic, circuitry, interfaces, and/or code that may be configured to store the neural network model 104. Alternatively, the neural network model 104 may be implemented in an electronic device separate from the server 102. The server 102 may be configured to store the neural network model 104 trained to provide a first application based on a first capability of each of the first set of electronic devices 106. The first application may be executable on each of the first set of electronic devices 106 to provide a first service to the user 112. The server 102 may be configured to receive second capability information of the second electronic device 108 from the second electronic device 108. Further, the server 102 may be configured to generate a second program code associated with a second application (i.e. for the first service) based on the second capability information of the second electronic device 108 and the first program code on which the neural network model 104 is trained. Further, the server 102 may generate the second application for execution on the second electronic device 108 based on the generated second program code. The server 102 may further transmit the second application to the second electronic device 108, via the communication network 110, such that the first service may be provided on the second electronic device 108 by the execution of the second application. Examples of the server 102 may include, but are not limited to, an application server (for example an Artificial Intelligence (AI)-based server), a cloud server, a mainframe server, a database server, a file server, a web server, or other types of servers.

In one or more embodiments, the neural network model 104 may include electronic data, which may be implemented, for example, as a software component, and may rely on code databases, libraries, external scripts, or other logic or instructions for execution of a neural network algorithm by a processing device, such as circuitry (such as circuitry 202 in FIG. 2) of the server 102. The neural network model 104 may be implemented as code and routines configured to enable a computing device, such as the server 102, to perform one or more operations. The one or more operations may include generation of a program code for an application for an electronic device based on capability information of the electronic device. The neural network model 104 may be a pre-stored model that correlates certain program codes with capability information of different electronic devices. Additionally, or alternatively, the neural network model 104 may be implemented using hardware including a processor, a microprocessor (e.g., to perform or control performance of one or more operations), a field-programmable gate array (FPGA), or an application-specific integrated circuit (ASIC). In some other instances, the neural network model 104 may be implemented using a combination of hardware and software.

Examples of the neural network model 104 may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), a Long Short Term Memory (LSTM) network based RNN, CNN+ANN, LSTM+ANN, a gated recurrent unit (GRU)-based RNN, a fully connected neural network, a deep Bayesian neural network, a Generative Adversarial Network (GAN), and/or a combination of such networks. In some embodiments, the neural network model 104 may include numerical computation techniques using data flow graphs. In certain embodiments, the neural network model 104 may be based on a hybrid architecture of multiple Deep Neural Networks (DNNs).

Each of the first set of electronic devices 106 may comprise suitable logic, circuitry, interfaces, and/or code that may be configured to perform one or more general purpose computing operations for one or more users (such as the user 112). For example, each of the first set of electronic devices 106 may be configured to playback media content. Each of the first set of electronic devices 106 may include the first capability information, which each of the first set of electronic devices 106 may transmit to the server 102. The first capability information may indicate hardware or software capabilities of corresponding device of each of the first set of electronic devices 106. Based on the first capability information, the server 102 may generate or store the first application for the first service. Each of the first set of electronic devices 106 may receive the first application for the first service from the server 102. Each of the first set of electronic devices 106 may install and execute the received first application to provide the first service to the user 112. Examples of the first set of electronic devices 106 may include, but are not limited to, a television, a mobile phone, a tablet computing device, a personal computer, a gaming console, a media player, a speaker device, a home theatre system, a digital camera, a head-mounted device, an automotive media rendering device, an electronic musical instrument, or other consumer electronic device.

The second electronic device 108 may comprise suitable logic, circuitry, interfaces, and/or code that may be configured to perform one or more general purpose computing operations for the one or more users (such as the user 112). For example, the second electronic device 108 may be configured to playback the media content. In accordance with an embodiment, the second electronic device 108 may correspond to a new electronic device to be used by the one or more users (such as the user 112). The second electronic device 108 may include the second capability information, which the second electronic device 108 may transmit to the server 102. The second capability information may indicate a hardware or software capability of the second electronic device 108. The second electronic device 108 may be configured to receive the generated second application from the server 102 and may install and execute the received second application to provide the first service to the user 112 such that user experience of the first service may not be disrupted based on the change of usage between one of the first set of electronic devices 106 and the second electronic device 108. Examples of the second electronic device 108 may include, but are not limited to, a television, a mobile phone, a tablet computing device, a personal computer, a gaming console, a media player, a speaker device, a home theatre system, a digital camera, a head-mounted device, an automotive media rendering device, an electronic musical instrument, or other consumer electronic device.

The communication network 110 may include a communication medium through which the server 102, the first set of electronic devices 106, and the second electronic device 108 may communicate with one another. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the server 102 may be configured to receive a request for the first service (for example, but not limited to, a multimedia content streaming service) from the second electronic device 108. The request may be generated due to usage of the second electronic device 108 by the user 112, to further receive the first service. The first service may be initially provided on a first electronic device 106a (i.e. one of the first set of electronic devices 106) based on execution of a first application on the first electronic device 106a for the user 112. The server 102 may include the neural network model 104 that may be already trained to provide the first application for a first capability of the first electronic device 106a. The second electronic device 108 may be a new electronic device which may not include any application or may not have the capability to provide the first service to the user 112, who may receive the first service on the first electronic device 106a through the first application.

In an embodiment, the server 102 may be configured to receive the second capability information (i.e. which may indicate the second capability) of the second electronic device 108 from the second electronic device 108. In an embodiment, the second capability of the second electronic device 108 may be different (i.e. either lower or higher) from the first capability of the first set of electronic devices 106 (for example the first electronic device 106a). The details of the first capability and the second capability are described, for example, in FIG. 3. The server 102 may be configured to generate the second program code based on the received second capability information of the second electronic device 108 and the first program code of the first application on which the neural network model 104 is trained. The generation of the second program code may be further based on the application of the neural network model 104 on the received second capability information. The generation of the second program code based on the second capability information and the trained neural network model 104 is further described, for example, in FIG. 3. The server 102 may be further configured to generate the second application associated with the first service based on the generated second program code. The server 102 may be further configured to transmit the generated second application to the second electronic device 108 to provide the first service on the second electronic device 108 by execution of the second application on the second electronic device 108.

The server 102 may store the neural network model 104 which may be trained based on the capability (e.g., the first capability information) of the first electronic device 106a (e.g., one of the first set of electronic devices 106) and a program code (e.g., the first program code) of the developed application (e.g., the first application) for the first service.

The server 102 may automatically generate an application (e.g., the second application) that may be executable on a new electronic device (e.g., the second electronic device 108), based on a capability of the new electronic device and the trained neural network model 104, in real-time. In contrast to conventional solutions including manual application development, the disclosed server 102 may provide real-time and automatic generation of the second application which may be a more efficient application development solution for the second electronic device 108 with different or new capabilities. Further, the real-time and the automatic generation of the second application may provide seamless usage of the first service to the user 112 when the user 112 changes their electronic devices (e.g., from the first electronic device 106a to the second electronic device 108) with different capabilities or instructs their existing electronic device (e.g., the first electronic device 106a) to provide the first service with limited capabilities or features. The neural network model 104 based application generation has been explained further, for example, in FIGS. 3, 4A, 4B, and 5.

Figure 2:
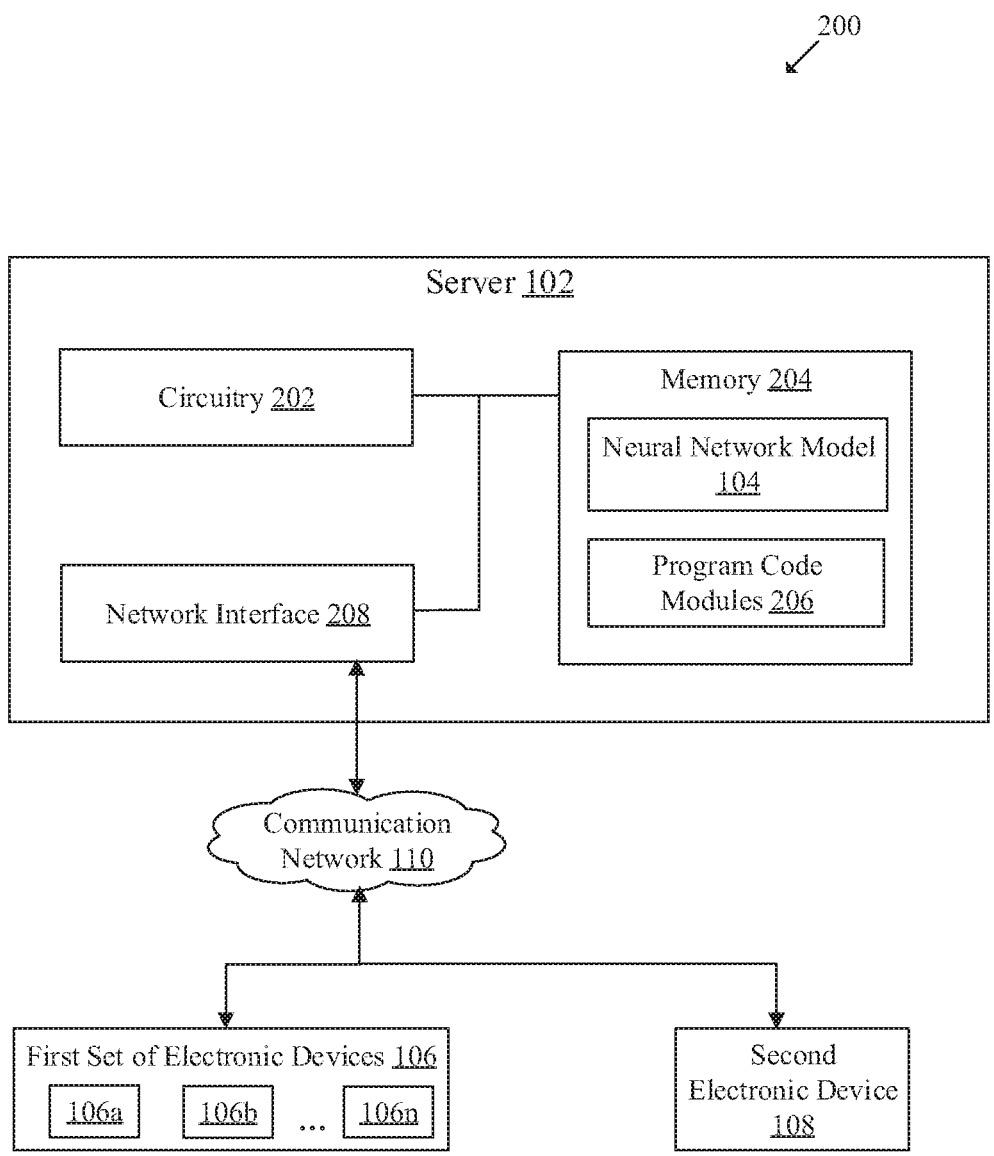
FIG. 2 is a block diagram that illustrates an exemplary server for application generation for electronic device based on neural network model, in accordance with an embodiment of the disclosure.

FIG. 2 is a block diagram that illustrates an exemplary server for neural network model based application generation, in accordance with an embodiment of the disclosure. FIG. 2 is explained in conjunction with elements from FIG. 1. With reference to FIG. 2, there is shown a block diagram 200 of the server 102 that may be coupled to the first set of electronic devices 106 and the second electronic device 108, via the communication network 110. The server 102 may further include circuitry 202, memory 204, and a network interface 208. The memory 204 may be configured to store the neural network model 104 and program code modules 206. The server 102 may connect to the communication network 110, via the network interface 208.

The circuitry 202 may include suitable logic, circuitry, interfaces and/or code that may be configured to execute program instructions associated with different operations to be executed by the server 102. For example, some of the operations may include generation and storage of the neural network model 104 in the memory 204. The operations may further include reception of the second capability information, generation of the second program code, generation of the second application, and transmission of the second application to the second electronic device 108. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may comprise suitable logic, circuitry, interfaces and/or code that may be configured to store the neural network model 104. The memory 204 may store the first capability information of each of the first set of electronic devices 106 and the second capability information of the second electronic device 108. The memory 204 may be further configured to store the program code modules 206, which may store the first program code for the first application and the second program code for the second application. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 208 may comprise suitable logic, circuitry, interfaces, and/or code that may be configured to facilitate communication between the server 102, the first set of electronic devices 106, and the second electronic device 108, via the communication network 110. The network interface 208 may be implemented by use of various known technologies to support wired or wireless communication of the server 102 with the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The operations of the circuitry 202 are described in detail, for example in FIGS. 3, 4A, 4B and 5.

Figure 3:
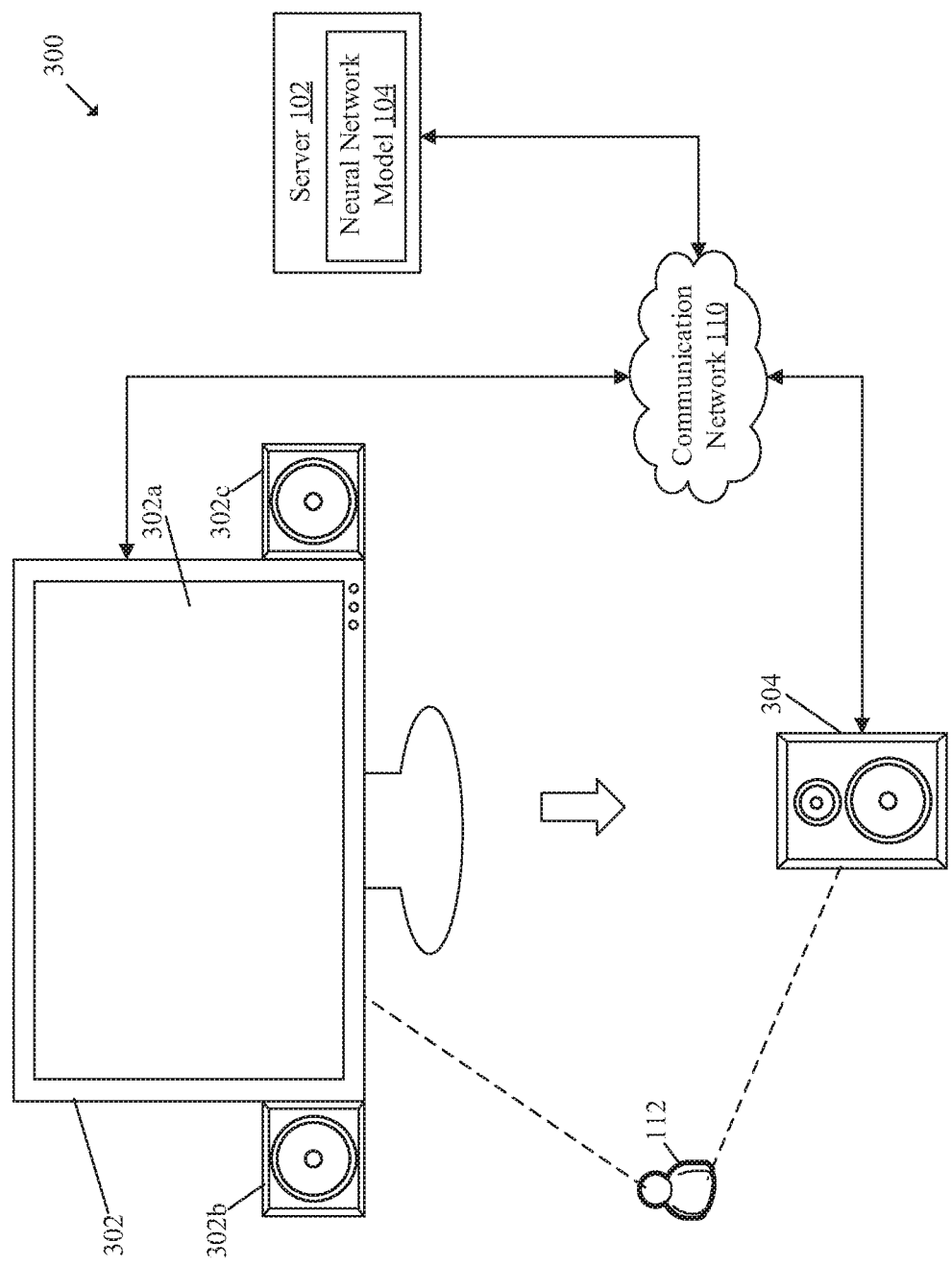
FIG. 3 illustrates an exemplary scenario for application generation for electronic device based on neural network model, in accordance with an embodiment of the disclosure.

FIG. 3 illustrates an exemplary scenario of a neural network model based application generation for electronic devices, in accordance with an embodiment of the disclosure. FIG. 3 is described in conjunction with elements from FIG. 1 and FIG. 2. With reference to FIG. 3, there is shown an exemplary scenario 300 that includes a first electronic device 302 (for example, a television (TV)), a second electronic device 304, (for example, a sound bar), and the server 102. The first electronic device 302 may include a display device 302a, a first speaker device 302b, and a second speaker device 302c. Each of the first electronic device 302 and the second electronic device 304 may be connected to the server 102, through the communication network 110. Further, there is shown in FIG. 3, the server 102 may include the neural network model 104. In FIG. 3, there is further shown a user (such as the user 112), who may own or be associated with the first electronic device 302 and the second electronic device 304. It may be noted that the first electronic device 302 and the second electronic device 304 shown in FIG. 3 are presented merely as an example of one of the first set of electronic devices 106 and the second electronic device 108, respectively. The present disclosure may be also applicable to other types of the first set of electronic devices 106 and the second electronic device 108, such as, but not limited to, a display device, a mobile phone, a home theatre system, a smart speaker, or an in-vehicle entertainment system. A description of other types of electronic devices has been omitted from the disclosure for the sake of brevity.

In an embodiment, the first electronic device 302 may include a first application that may be installed on the first electronic device 302 to provide a first service to the user 112. The first application may include software program (for example the first program) that may be executable on the first electronic device 302 to render the first service on the first electronic device 302. Examples of the first service may include, but are not limited to, a multimedia content streaming service, an audio playback service, a video playback service, a gaming service, an office productivity suite service, an electronic publishing service, a social networking service, an instant messaging service, a dictionary/encyclopedia service, a geo-location service, or an e-commerce service.

The first electronic device 302 may be associated with the first capability, that may be indicated by the first capability information. In an example, the first electronic device 302 may include a display capability associated with the display device 302a and an audio output capability associated with each of the first speaker device 302b and the second speaker device 302c. The first electronic device 302 may provide the first service to the user 112 based on the execution of the first application which may be provided or generated based on the first capability information. The first capability may include at least one of a hardware capability and a software capability of the first electronic device 302. Examples of the hardware capability may include, but are not limited to, an image content rendering capability, an audio content rendering capability, a closed caption capability, a size of a display screen, a resolution of the display device 302a, a processor speed, a size of storage device, a hardware architecture, a type of input device, a network capability, a type of in-built sensor, a battery capacity, or a power of audio device. Further, examples of the software capability may include, but are not limited to, a type and a version of operating system (OS), a programming language, security settings, a version of web browser, a communication protocol, or a current application version related to the first service.

In an example, the first service, such as, a multimedia content streaming service, may require the first electronic device 302 to display an image portion of media content on the display device 302a and simultaneously render an audio portion of the media content on at least one of the first speaker device 302b and the second speaker device 302c. On execution, the first application installed on the first electronic device 302 may control the first electronic device 302 to display the image portion on the display device 302a and render the audio portion on the first speaker device 302b and/or the second speaker device 302c, to provide the first service to the user 112.

In an embodiment, the trained neural network model 104 may store a relationship between capability information (or features) of electronic devices (such as the first electronic device 302) and corresponding applications (i.e. the first application) for different services, such as the first service. Examples of the relationship between the first capabilities and the first applications of the first set of electronic devices 106 stored in the trained neural network model 104, are presented in Table 1, as follows:

TABLE 1

Examples of the relationships between different capabilities of electronic devices, and corresponding applications stored in the trained neural network model 104 for a particular service.

| Service | Electronic Device Capability | Application |
| --- | --- | --- |
| First service | Capability-1 | Application-1 (name, size, program code-1, memory location, version) |
| First service | Capability-2 | Application-2 (name, size, program code-2, memory location, version) |
| First service | Capability-3 | Application-3 (name, size, program code-3, memory location, version) |
| First service | Capability-4 | Application-4 (name, size, program code-4, memory location, version) |

With reference to Table 1, in an example, the capability-1 may indicate a high definition (HD) display with audio-video output capability and support for high dynamic range (HDR) media content. The capability-1 may correspond to the first electronic device 302 (for example television). The neural network model 104 may be already trained to provide the first application (for example, "Application-1" shown in Table 1) for the information about "capability-1, that may be input to the trained neural network model 104". In some embodiment, the trained neural network model 104 may output location information about the first application. The location information may indicate where the first application may be stored, such a memory location of the memory 204 or a particular uniform resource locator (URL). The first application may refer or include program code (for example, the program code-1). The program code may include, but is not limited to, a programming language, an operating system (OS), code parameters, and a memory location of storage of the program code. For example, for an Android based smart TV (i.e. software capability), the programming language may be "java", and the OS may be a certain version of the Android OS. In some embodiments, the provided Application-1 may include various parameters that may include, but are not limited to, name of the application, size of the application, memory location of the application, and a version of the application. For example, in case of Android based smart TV (i.e. software capability), the application-1 may correspond to a smart TV application coded in "java" programming language supported by the Android OS. For example, the smart TV application may be of a certain size and may be stored in the memory 204 of the server 102 to provide the first service to the user 112. The first electronic device 302 may receive or download the first application (for example, "Application-1") from the server 102 and get the first service based on the execution of the first application on the first electronic device 302.

With reference to Table 1, in another example, the capability-2 of the first electronic device 302 (for example a sound bar) may include sound output capability with display support for audio metadata. The neural network model 104 may be already trained to provide the first application (for example, "Application-2" shown in Table 1) for the information about "capability-2, that may be input to the trained neural network model 104". The first application may refer to or may include a program code (for example, the program code-2). The program code may include, but is not limited to, a programming language, an operating system (OS), code parameters, and a memory location of storage of the program code. For example, for an embedded OS based sound bar (i.e. software capability), the programming language may be "embedded C", and the OS may be a certain embedded OS, such as Embedded Linux OS. In some embodiments, the provided Application-2 may include various parameters that may include, but are not limited to, name of the application, size of the application, memory location of the application, and a version of the application. The first electronic device 302 may receive or download the first application (for example, the "Application-2") from the server 102 and get the first service based on the execution of the first application on the first electronic device 302.

In another example, with reference to Table 1, the capability-3 of the first electronic device 302 (for example a mobile phone) may include a small screen size with an audio/video output capability. The neural network model 104 may be already trained to provide the first application (for example, "Application-3" shown in Table 1) for the information about "capability-3, that may be input to the trained neural network model 104". The first application may refer to or may include a program code (for example, the program code-3, as shown in Table 1). The first electronic device 302 may receive or download the first application (for example, the "Application-3") from the server 102 and get the first service based on the execution of the first application on the first electronic device 302.

In yet another example, with reference to Table 1, the capability-4 of the first electronic device 302 (for example a home theatre system) may include an audio/video output with closed captioned capability. The neural network model 104 may be trained to provide the first application (for example, "Application-4" shown in Table 1) for the information about "capability-4 that may be input to the neural network model 104". The first application may refer to or may include a program code (for example, the program code-4, as shown in Table 1). Therefore, the trained neural network model 104 may provide the first application (i.e. output of the neural network model 104) for different capabilities of the first set of electronic devices 106, where information about the capabilities may the input for the trained neural network model 104. The neural network model 104 may be a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons, for example). The input layer may be provided with the inputs (i.e. information about the first capability information of the first set of electronic devices 106 or the second capability information of the second electronic device 108) of the neural network model 104. Outputs of all nodes in the input layer may be coupled to at least one node of hidden layer(s). Node(s) in the output layer may receive inputs from at least one hidden layer to output a result (such as the first application or the location information about the first application). The number of layers and the number of nodes in each layer may be determined from hyper-parameters of the neural network. Such hyper-parameters may be set before or while training the neural network on a training dataset (i.e. different capabilities of the first set of electronic devices 106).

Each node of the neural network model 104 may correspond to a mathematical function (e.g., a sigmoid function or a rectified linear unit) with a set of parameters, tunable to train the neural network model 104 for the relationship between the first capabilities and the first applications of the first set of electronic devices 106. The set of parameters may include, for example, a weight parameter, a regularization parameter, and the like. Each node may use the mathematical function to compute an output based on one or more inputs from nodes in other layer(s) (e.g., previous layer(s)) of the neural network model 104. All or some of the nodes of the neural network model 104 may correspond to same or a different same mathematical function.

In training of the neural network model 104, one or more parameters of each node of the neural network may be updated based on whether an output of the final layer for a given input (from the training dataset) matches a correct result based on a loss function for the neural network. This update process may be repeated for same or a different input till a minima of loss function may be achieved and a training error may be minimized. Several methods for training the neural network model 104 are known in art, for example, gradient descent, stochastic gradient descent, batch gradient descent, gradient boost, meta-heuristics, and the like. The neural network model 104 may include code and routines configured to enable a computing device, such as the server 102 to perform one or more operations for classification of one or more inputs (i.e. capabilities) into one or more outputs (i.e. applications).

In an embodiment, the first application may provide the first service to the user 112 once executed on the corresponding first electronic device 302 from the first set of electronic devices 106. Thus, with respect to FIG. 3, the first electronic device 302 (for example the television) may provide the first service to the user 112 based on the execution of the first application on the first electronic device 302. The first application may control different functions, for example the display of image portion, close captions, or playback of audio portion of the media content, provided by the first service. The control of different functions may be based on the display and sound playback capabilities (i.e. first capability information) of the first electronic device 302.

With respect to FIG. 3, there is further shown the second electronic device 304, which may be associated with the user 112 (for example same user who may be associated with or use the first electronic device 302). In an embodiment, the second electronic device 304 may have the second capability which may be limited or lesser than the first capability of the first electronic device 302 on which the user 112 used to experience the first service through the first application. The user 112 may want to use or experience the same first service on the second electronic device 304, which may not be capable to execute the first application to provide the first service. For example, the second electronic device 304 be a sound bar (as shown in FIG. 3), which may not have a display screen or capability to render the first service (for example a multimedia content streaming service). In another embodiment, the second electronic device 304 may have similar capabilities or features as the first electronic device 302, however the user 112 may want to explore lesser hardware/software features of the second electronic device 304 or the first application, while the execution of the first service on the second electronic device 304. For example, the first application may be capable to provide multiple features (for example three features including display of video content, playback of audio content, and display of close caption) to provide first service, however, the user 112 may want to get limited features (for example two features of display and playback of video/audio content without close caption) to get the first service on the second electronic device 304.

In an embodiment, the second electronic device 304 may receive a request for the first service from the user 112 and further send the received request to the circuitry 202 of the server 102. The second electronic device 304 may include the second capability information (i.e. indicate the second capability) in the request sent to the server 102. In an embodiment, information about the first service (for example name or URL of the first service) may be included in the sent request. In some embodiments, information about the features for the first application, which the user 112 wants, may be included in the sent request. For example, the features desired by the user 112 may be different from the second capability of the second electronic device 304. In a scenario, the features desired by the user 112 may be lesser than the second capability of the second electronic device 304. In an example, the user 112 may desire for an audio playback feature, while the second capability may include an audio playback and an audio metadata display capability of the second electronic device 304. In such scenario, the execution of the first service on the second electronic device 304 may be according to the features desired by the user 112.

In accordance of an embodiment, the circuitry 202 of the server 102 may be configured to receive the second capability information of the second electronic device 304 from the second electronic device 304. In an embodiment, the second capability information of the second electronic device 304 includes at least one of hardware capability or software capability. In an embodiment, the circuitry 202 of the server 102 may be configured to retrieve a pre-generated application (for example the first application as a second application) from the memory 204 for the first service based on application of the second capability information on the trained neural network model 104. For example, with reference to Table 1, in case the second capability includes an audio/video output with closed captioned capability (i.e., the Capability-4 in the Table 1), the circuitry 202 may determine or retrieve the Application-4 as the second application for the first service to be provided on the second electronic device 304.

In an embodiment, the circuitry 202 may be further configured to generate a second program code associated with the second application for the first service based on the second capability information of the second electronic device 304 and the first program code. The circuitry 202 may generate the second program code by use of the neural network model 104 trained on the first application or the first program code to provide the first service. For example, the second electronic device 304 may correspond to the sound bar or a car sound system with a 5.1 audio channel support. The circuitry 202 may be configured to apply the second capability information on the neural network model 104 to determine the first program code based on which the second program code is to be generated. For example, referring to Table 1, based on the second capability information, the circuitry 202 may determine that an electronic device (e.g., a sound system on which the neural network model 104 is already trained) has substantially similar capabilities (for example, the capability-2) with respect to the second capability included in the second capability information. The circuitry 202 may further compare the capability-2 (i.e. on which the neural network model 104 is trained) with the received second capability information to determine that both the second electronic device 304 and the electronic device of capability-2 have similar capabilities of sound reproduction, however, the second electronic device 304 may have an additional capability of 5.1 audio channel support. The circuitry 202 may further apply the second capability information (including capability similar to the capability-2) on the neural network model 104 to determine a program code (i.e. the program code-2) as the output of the trained neural network model 104. The neural network model 104 may be already trained on the relationship between the capability-2 (i.e. first capability information) and the output program code-2 (i.e. first program code), as shown in Table 1.

The circuitry 202 may be further configured to extract certain parameters from the program code-2, such as, but not limited to, a programming language (e.g., C language) syntax, an OS (e.g., an embedded OS), code parameters, one or more code instructions/modules, or a memory location of required program codes. The circuitry 202 may be configured to update the extracted parameters of the program code-2 (i.e. first program code) based on the determined additional capability (i.e. second capability information) of the second electronic device 304 to generate the second program code. For example, to generate the second program code, the circuitry 202 may be configured to update a first programming language (e.g., Java language) of the first program code of the first application to generate the second program code (i.e. with different programming language, like C language, compatible and supported for the second electronic device 304).

In an embodiment, the circuitry 202 may be configured to remove or add certain software instructions, functions, or application program interfaces (API) in the first program code (i.e. on which the neural network model 104 is trained) to generate the second program code. For example, for additional capability in the second capability information of "5:1 channel support", the circuitry 202 may update the first program code (for example, program code-2 in Table 1 supported by the electronic device such as, the sound system), to generate the second program code with the capability to generate sound with the "5:1 channel support". In some embodiments, the circuitry 202 may update the first program code to generate the second program code based on a communication protocol supported by the second electronic device 304, as per the second capability information. For example, the first program code may be compliant with a first communication protocol, (such as, Wi-Fi® communication protocol) that may be supported by the first electronic device 302. The circuitry 202 may generate the second program code from the first program code by conversion of the first program code to a program code compliant with a second communication protocol (such as, Bluetooth® communication protocol) that may be supported by the second electronic device 304.

In another example, the second electronic device 304 may have the second capability including audio/video display support without close caption capability. In such case, the second electronic device 304 may support output of audio/video content, however, may not be capable to display close caption or sub-title text for audio dialogues associated with the audio/video content. With reference to Table 1, the circuitry 202 of the server 102 may select the program code-4 based on a close match between the Capability-4 and the second capability, by use of the trained neural network model 104. Further, the circuitry 202 may update the selected program code-4, as the first program code, to generate the second program code with the capability to output audio/video content without close caption text. In an example, the circuitry 202 may remove program codes or instructions, with respect to display of the close caption text from the program code-4 (i.e. the first program code) to generate the second program code for the second electronic device 304. In some embodiments, circuitry 202 may search for different program codes or instructions from the memory 204 and add the identified program codes into the first program code to update the first program code and generate the second program code.

In accordance of an embodiment, the circuitry 202 may be further configured to generate the second application for the first service based on the generated second program code. In an embodiment, the circuitry 202 may use or update the extracted parameters of the first program code (for example, the program code-2 in Table 1) and re-configure or update the application-2 to generate the second application. In another embodiment, the circuitry 202 may convert the generated second program code into an executable format to generate the second application to provide the first service to the second electronic device 304. For example, the circuitry 202 may use a compiler software corresponding to a programming language (i.e. in which the second program code is written) to compile the second program code into an executable binary file or package that may be executable on a virtual machine or operating system of the second electronic device 304 to provide the first service. The executable binary file or package may correspond to the second application. The circuitry 202 may be further configured to transmit the generated second application to the second electronic device 304 for execution of the second application on the second electronic device 304 and to provide the first service on the second electronic device 304.

The disclosed server 102 may generate the second application and transmit the second application to the second electronic device 304 for the provision of the first service on the second electronic device 304. Thus, even though the second electronic device 304 initially does not include the second application to provide the first service, still the second electronic device 304 may be able to receive the second application for the first service in real-time, based on the trained neural network model 104. Such real-time and automatic generation of the second application may enhance efficiency for the development of applications required for electronic devices with different or new capabilities, in comparison to convention solutions including manual development of applications. Further, the real-time and automatic generation of the second application may provide seamless usage of the first service to the user 112 even if the user 112 changes their electronic devices with different capabilities or instructs their existing electronic device to provide the first service with limited capabilities or features.

In an embodiment, the circuitry 202 may be further configured to re-train the neural network model 104 based on the second capability information and the generated second application for the second electronic device 304. To re-train the neural network model 104, the circuitry 202 may correlate the second program code and/or the generated second application with the second capability information. The circuitry 202 may store information associated with the correlation in the neural network model 104 to re-train the neural network model 104. For example, the circuitry 202 may store information, such as, the second capability information (i.e., capability like audio/video output capability without close caption), the second program code (i.e., the updated program code-4), and the second application (i.e., the updated application-4) in the neural network model 104 based on the correlation of the second capability information (for example, capability-4) with the parameters associated with the second program code (for example updated program code-4) and the generated second application (for example updated application-4).

In an embodiment, the circuitry 202 may be further configured to perform at least one of a code inspection, a unit test, an integration test, or a system test to generate the second application based on the generated second program code. For example, the circuitry 202 may use a code review tool of the second program code to check the second program code for compliance with a predetermined set of rules associated with program development. In an example, the circuitry 202 may perform the unit test based on an automated test of each function within classes, objects, components, or modules of the second program code. Further, the circuitry 202 may perform the integration test and the system test on the modules of the second program code to check whether the different modules associated with the second application co-ordinate in a desired fashion, provide an expected output to a certain set of inputs, and further capable enough to provide the first service once executed on the second electronic device 304.

In an embodiment, a number of first features in the first application associated with the first service may be higher (or lower) than a number of second features in the generated second application based on the first capability information of the first electronic device 302 and the second capability information of the second electronic device 304, respectively. For example, for an audio-video (AV) streaming and playback service (i.e. first service), the first application for the first electronic device 302 (for example TV with the display device 302a, the first speaker device 302b, and the second speaker device 302c for an audio video output capability) may include three features to output audio content associated with the AV streamed service, output video content associated with the AV streamed service, and display lyrics (i.e. subtitle or close caption) of the output audio. Further, for the same AV streaming and playback service (i.e. the first service), the second application for the second electronic device 304 (for example a sound bar with a speaker for audio output capability) may include only one feature to output an audio associated with the AV streamed service. Thus, the number of features of the first application for the first electronic device 302 (i.e., TV) may be higher than the number of features of the second application for the second electronic device 304 (i.e., sound bar). A person having ordinary skill in the art would understand that the scope of the disclosure may not be so limited, and in certain scenarios, the number of features of the first application may be lower than or same as the number of features of the second application, without deviation from the scope of the disclosure. In case, of lower number of the second features, the circuitry 202 may remove certain program codes, instructions, or modules from the first program code to generate the second program code with lower number of features or capability than with the first program code (or with the first application).

In an embodiment, the circuitry 202 may be further configured to determine a set of configuration values for at least one setting of the second electronic device 304 based on the second capability information received from the second electronic device 304. The determination of the set of configuration values for the at least one setting of the second electronic device 304 may be based on a comparison of the first capability information with the second capability information. Examples of the at least one setting may include, but are not limited to, a display setting, a font setting, a color setting, a power setting, a menu setting, an audio setting, a network setting, a user-interface setting, a closed caption setting, an application setting, an accessibility setting, a diagnostic setting, or a security setting, associated with the second electronic device 304. The circuitry 202 may be further configured to transmit, to the second electronic device 304, the determined set of configuration values for the execution of the second application on the second electronic device 304.

In a scenario, for example, the first electronic device 302 may correspond to a TV with the first capability of a high definition (HD) display support for HD display resolutions (i.e. one of, but not limited to, 1024×576, 1152×648, and 1280×720). The second electronic device 304 may correspond to a mobile phone with the second capability of a standard definition (SD) display support for SD display resolutions including one of, but not limited to, 640×480, 800×600, and 960×720. In an example, the first application may be executed on the first electronic device 302 with an aspect ratio value of 16:9 of the display setting. In such scenario, the circuitry 202 may determine an aspect ratio value as 4:3 (i.e. configuration value) for execution of the second application on the second electronic device 304 based on the second capability (i.e. SD display support) of the second electronic device 304.

In another example, the first electronic device 302 may correspond to a TV with the first capability of an HDR display support, while the second electronic device 304 may correspond to a display device with the second capability of a Standard Dynamic Range (SDR) display support. In such example, the circuitry 202 may extrapolate a display brightness value associated with execution of the first application on the first electronic device 302 to an equivalent display brightness value (i.e. configuration value of the display setting) for the second application to be executed on the second electronic device 304.

In yet another example, the first electronic device 302 may correspond to a TV with a speech-to-text conversion support (i.e. first capability), while the second electronic device 304 may correspond to a car audio system with a textual/numeral input support (i.e. second capability). In an example, the first electronic device 302 may include a voice-based password entry option as a security setting mechanism for the first application. In such case, the circuitry 202 may generate the second application with textual/numeral password entry options (i.e. the configuration values) of the security setting, for the second application to be executed on the second electronic device 304.

Figure 4A:
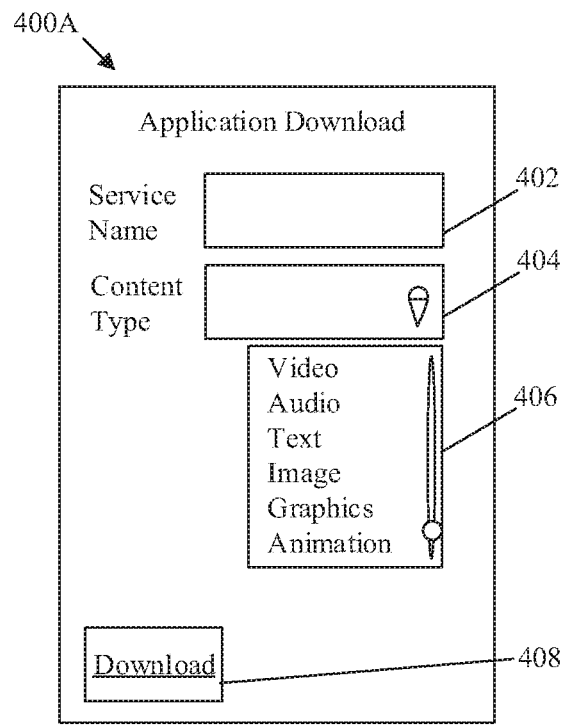
FIGS. 4A and 4B are diagrams that collectively illustrate exemplary user interfaces (UIs) for an electronic device to download or update an application, in accordance with an embodiment of the disclosure.
Figure 4B:
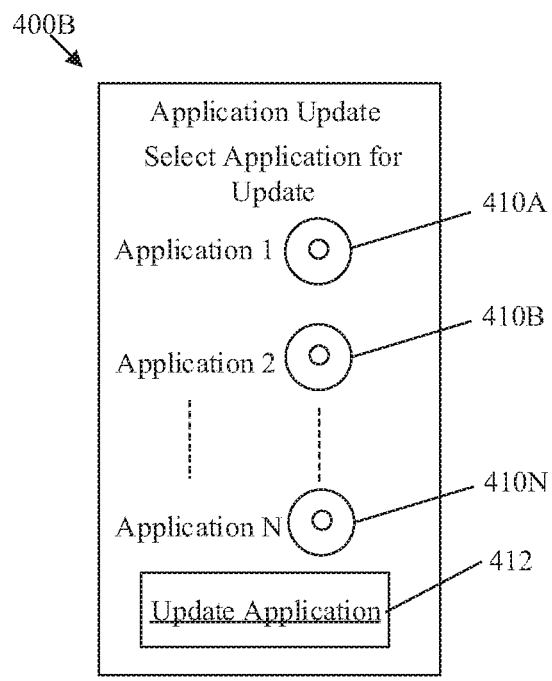

FIGS. 4A and 4B are diagrams that collectively illustrate exemplary user interfaces (UIs) for an electronic device to download or update an application, in accordance with an embodiment of the disclosure. FIGS. 4A and 4B are explained in conjunction with elements from FIGS. 1, 2, and 3. With reference to FIG. 4A, there is shown a user interface (UI) 400A that may be presented on a display device (not shown) of the second electronic device 108 to download or receive the second application for the first service, based on user-selected media content type associated with the first service. The UI 400A may include a first UI element 402, a second UI element 404, a third UI element 406, and a fourth UI element 408, as shown in FIG. 4A.

In an embodiment, the first UI element 402 and the second UI element 404 may include, but are not limited to, a textbox or a dropdown list. In an example, the first UI element 402 may be a textbox to receive a user-input that may indicate the first service for which the second application is to be generated by the server 102 and further downloaded from the server 102 to the second electronic device 108. The user-input received from the first UI element 402 may include a name or Uniform Resource Locator (URL) of the indicated first service. Further, for example, the second UI element 404 may be a dropdown list of media content type associated with the indicated first service. The third UI element 406 may be a UI control that may represent selectable values from the dropdown list of the second UI element 404. Examples of the media content type may include, but are not limited to, video, audio, text, image, graphics, and animation types of the media content. The third UI element 406 may receive a user-selection of one or more of the media content types and select the user-selected media content type in the dropdown list of the second UI element 404. Further, for example, the fourth UI element 408 may be a UI button to submit a first user-input indicative of the user-selected media content types (i.e. associated with the indicated first service) to the server 102.

In an embodiment, the circuitry 202 of the server 102 may be configured to receive, from the second electronic device 108, the first user-input indicative of the user-selected media content types associated with the indicated first service. The circuitry 202 may be configured to generate the second program code based on the received first user-input and the received second capability information of the second electronic device 108. The circuitry 202 may be further configured to generate the second application associated with the first service based on the generated second program code, as described, for example, in FIG. 3.

In an example, the indicated first service may correspond to the audio streaming and playback service, and the second electronic device 108 may correspond to a sound bar with an audio output capability and an audio metadata (i.e. subtitle) display capability (i.e. the second capability information). For example, in case the first user-input indicates audio content and text content as the selected media content types associated with the indicated audio streaming and playback service (i.e. the first service), the circuitry 202 may be configured to generate the second program code based on the second capability information and the first program code identified from the trained neural network model 104 as described, for example, in FIG. 3. Further, the circuitry 202 may further update the generated second program code based on the user-selected media content types (e.g., audio and text content). The circuitry 202 may be further configured to generate the second application for the indicated audio streaming and playback service (i.e. the first service) based on the generated or updated second program code. Once executed on the second electronic device 108, the second application may be configured to playback the streamed audio content of the first service on an audio output device of the second electronic device 108 and display metadata (i.e. subtitle associated with the streamed audio content) as text on the display device of the second electronic device 108.

With reference to FIG. 4B, there is shown UI 400B that may be presented on the display device of the second electronic device 108 or the second electronic device 304 to update the downloaded second application. The UI 400A may include a plurality of UI elements 410A-410N and a fifth UI element 412.

In an embodiment, for example, each of the plurality of UI elements 410A-410N may include, but is not limited to, a checkbox or a radio-button. The plurality of UI elements 410A-410N on the second electronic device 108 may be configured to receive a user-input indicative of user-selection of the second application from amongst a set of applications that may be pre-installed or downloaded on the second electronic device 108. The user-selection is to update the second application on the second electronic device 108. In an embodiment, the fifth UI element 412 may be a UI button to submit (or transmit), to the server 102, a second user-input indicative of the user-selected second application to further update the second application on the second electronic device 108.

In an embodiment, the circuitry 202 of the server 102 may be configured to receive the second user-input from the second electronic device to update the second application. In an embodiment, the second electronic device 108 may be configured to determine a change in the second capability information of the second electronic device 108. The circuitry 202 may be configured to receive updated second capability information (in case of a change in the second capability information) from the second electronic device 108. Further, the circuitry 202 of the server 102 may be configured to generate a third program code based on the generated second program code, the received second user-input, and the second capability information (or the updated second capability information, in case of the change in the second capability information). For example, the generated second program code may be re-configured or updated based on code parameters associated with the changes in the updated second capability information, to generate the third program code. Examples of code parameters may include, but are not limited to, initial values of variables in the second program code, parameters associated with functions/modules in the second program code, address of a memory location associated with a program code module of the second program code, or a version associated with the second program code. The circuitry 202 may be configured to update the second application based on the generated third program code, and transmit the updated second application to the second electronic device 108. The updated second application may be executed on the second electronic device 108 to provide the first service.

In an embodiment, the circuitry 202 of the server 102 may be configured to transmit, to the second electronic device 108, a UI element associated with the second application. The UI element may be configured to install or update the second application on the second electronic device 108. In an example, the second electronic device 108 may receive a UI element (e.g., an icon such as the UI element 410A) from the server 102. The received UI element may be presented on the display device of the second electronic device 108 on the UI 400B. The received UI element may receive the user-input indicative of the user-selection of the second application to update the second application. The fifth UI element 412 may be selected to submit the user-input indicative of the user-selection of the second application to the server 102. The circuitry 202 of the server 102 may receive the submitted user-input from the second electronic device 108 and may update or install the user-selected second application on the second electronic device 108 (or the second electronic device 304).

In an embodiment, the circuitry 202 may be configured to re-train the neural network model 104 based on the second user-input, the second capability information (i.e., the updated second capability information, in case of the change in the second capability information), and the updated second application for the second electronic device 108. For example, to re-train the neural network model 104, the circuitry 202 may update a correlation between the updated second capability information and the code parameters associated with the second/third program code (or with the updated second application) in the memory 204, that may store the trained neural network model 104.

It may be noted that the user interfaces (UI) 400A and 400B shown in FIGS. 4A and 4B are presented merely as exemplary user interfaces to download an application or an updated application on the second electronic device 108 or the second electronic device 304. The second electronic device 304 may include other types of user interfaces to download or update the second application capable to provide the first service. A description of other types of user interfaces has been omitted from the disclosure for the sake of brevity.

Figure 5:
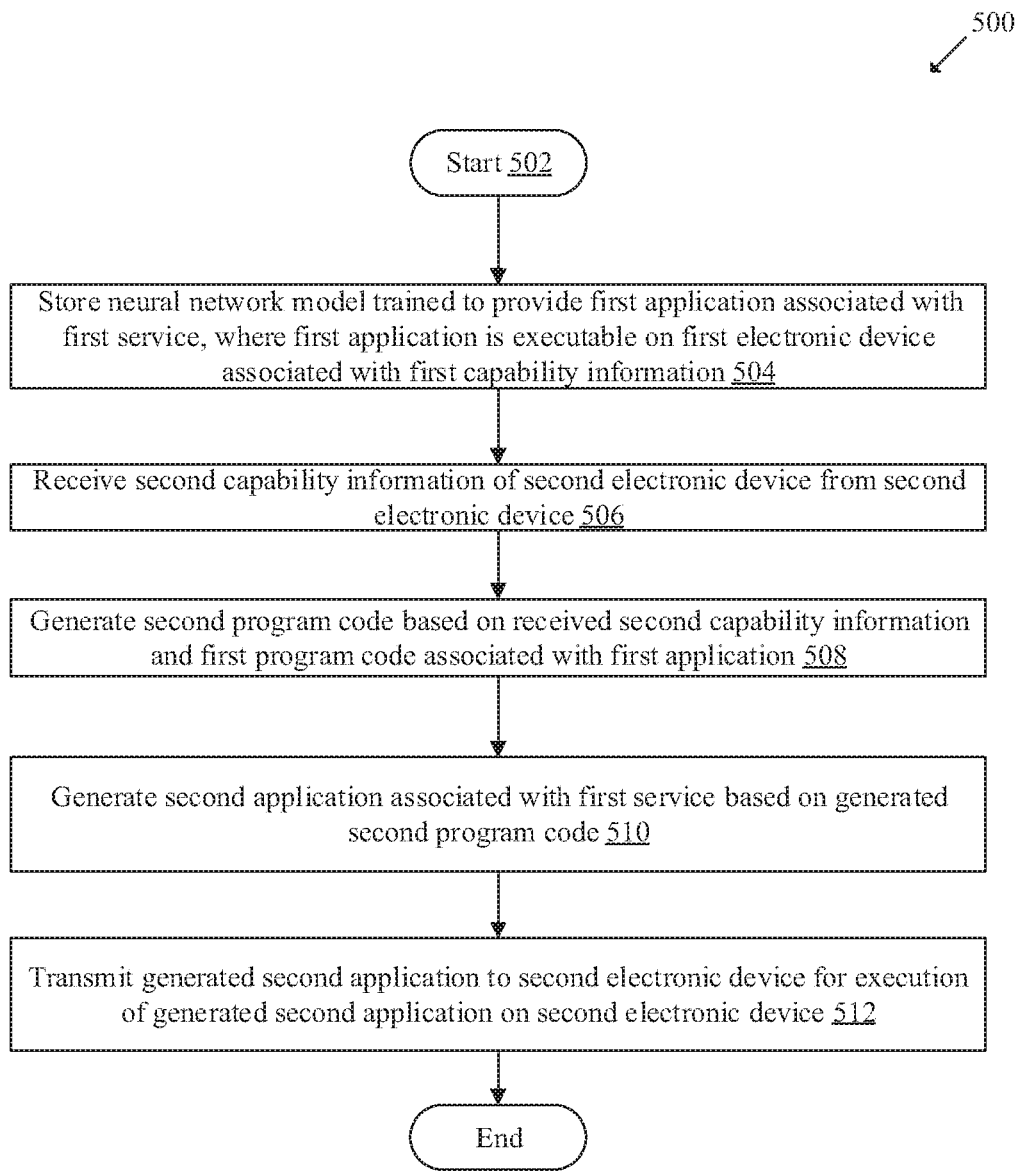
FIG. 5 is a flowchart that illustrates exemplary operations for application generation for electronic device based on neural network model, in accordance with an embodiment of the disclosure.

FIG. 5 is a flowchart that illustrates exemplary operations for neural network model based application generation for an electronic device, in accordance with an embodiment of the disclosure. FIG. 5 is described in conjunction with elements from FIGS. 1, 2, 3, 4A and 4B. With reference to FIG. 5, there is shown a flowchart 500. The operations of the flowchart 500 may be executed by a computing system, such as the server 102 or the circuitry 202. The operations may start at 502 and proceed to 504.

At 504, the neural network model 104 trained to provide the first application associated with the first service may be stored. The first application may be executable on the first electronic device 302 associated with the first capability information. In an embodiment, the circuitry 202 of the server 102 may be configured to store the trained neural network model 104 in the memory 204 of the server 102. Alternatively, the circuitry 202 may store the trained neural network model 104 in an electronic device separate from the server 102. Details related to the trained neural network model 104 and exemplary values, relationships, or correlation that may be stored in the trained neural network model 104 are described, for example, in FIG. 3.

At 506, the second capability information of the second electronic device 108 (or the second electronic device 304) may be received from the second electronic device 108. In an embodiment, the circuitry 202 may be configured to receive the second capability information from the second electronic device 108 (or the second electronic device 304).

At 508, the second program code may be generated based on the received second capability information and the first program code associated with the first application. In an embodiment, the circuitry 202 may be configured to generate the second program code based on the received second capability information and the first program code associated with the first application. Details related to the generation of the second program code are described, for example, in FIG. 3.

At 510, the second application associated with the first service may be generated based on the generated second program code. In an embodiment, the circuitry 202 may be configured to generate the second application associated with the first service based on the generated second program code. Details related to the generation of the second application are described, for example, in FIG. 3.

At 512, the generated second application may be transmitted to the second electronic device 108 (or the second electronic device 304) for execution of the generated second application on the second electronic device 108 (or the second electronic device 304). In an embodiment, the circuitry 202 may be configured to transmit the generated second application to the second electronic device 108 (or the second electronic device 304). The second electronic device 108 (or the second electronic device 304) may be configured to receive the second application and execute the received second application to provide the first service on the second electronic device 108 (or the second electronic device 304) for the user 112. The control may pass to end.

Although the flowchart 500 is illustrated as discrete operations, such as 504, 506, 508, 510, and 512, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, instructions executable by a machine and/or a computer, such as, the server 102. The instructions may cause the machine and/or computer to perform operations that may include storage of a neural network model trained to provide a first application associated with a first service. The first application may be executable on a first electronic device associated with first capability information. The operations may further include reception of second capability information associated with a second electronic device, from the second electronic device. The second electronic device may be different from the first electronic device. The operations may further include generation of a second program code based on the received second capability information of the second electronic device and a first program code associated with the first application. Further, the operations may include generation of a second application associated with the first service based on the generated second program code. The operations may further include transmission of the generated second application to the second electronic device. The generated second application may be executed on the second electronic device to provide the first service on the second electronic device.

Exemplary aspects of the disclosure may include a server (such as, the server 102 of FIG. 1) configured to store a neural network model (such as, the neural network model 104 of FIG. 1). The server 102 may include circuitry (such as, the circuitry 202 of FIG. 2) and a memory (such as, the memory 204 of FIG. 2) coupled to the circuitry 202. The memory 204 may be configured to store the neural network model 104 that may be trained to provide a first application associated with a first service. The first application may be executable on a first electronic device (such as, the first electronic device 302 of FIG. 3) associated with first capability information. The circuitry 202 may be further configured to receive second capability information associated with a second electronic device (such as, the second electronic device 304 of FIG. 3), from the second electronic device 304. The second electronic device 304 may be different from the first electronic device 302. The circuitry 202 may further generate a second program code based on the received second capability information of the second electronic device 304 and a first program code associated with the first application. Further, the circuitry 202 may be configured to generate a second application associated with the first service based on the generated second program code. The circuitry 202 may be further configured to transmit the generated second application to the second electronic device 304. The generated second application may be executed on the second electronic device 304 and may provide the first service on the second electronic device 304.

In one or more embodiments, the circuitry 202 may be further configured to re-train the neural network model 104 based on the second capability information and the generated second application for the second electronic device 304. The circuitry 202 may be further configured to perform at least one of a code inspection, a unit test, an integration test, or a system test to generate the second application based on the generated second program code.

In one or more embodiments, the first capability information associated with the first electronic device 302 and the second capability information of the second electronic device 304 may include at least one of hardware capability or software capability. The hardware capability may include, but is not limited to, at least one of an image content rendering capability, an audio content rendering capability, a closed caption capability, a size of a display screen, a resolution of the display screen, a processor speed, a size of storage device, a hardware architecture, a type of input device, a network capability, a type of in-built sensor, a battery capacity, or a power of audio device. The software capability may include, but is not limited to, at least one of a type and a version of operating system (OS), a programming language, security settings, a version of web browser, a communication protocol, or a current application version related to the first service.

In one or more embodiments, the circuitry 202 may be further configured to update the first program code of the first application based on the second capability information to generate the second application for the second electronic device 304. The circuitry 202 may be configured to update a first programming language of the first program code of the first application based on a second programming language indicated by the second capability information, to generate the second application for the second electronic device 304. The second electronic device 304 may support the second programming language.

In one or more embodiments, a number of first features in the first application associated with the first service may be higher or lower than a number of second features in the generated second application based on the first capability information of the first electronic device 302 and the second capability information of the second electronic device 304.

In one or more embodiments, the circuitry 202 may be further configured to receive, from the second electronic device 304, a first user-input indicative of a media content type associated with the first service. The second program code may be generated based on the received first user-input and the received second capability information. Further, the second application associated with the first service may be generated based on the generated second program code.

In one or more embodiments, the circuitry 202 may be further configured to determine a set of configuration values for at least one setting of the second electronic device 304 based on the second capability information. The circuitry 202 may be configured to transmit, to the second electronic device 304, the determined set of configuration values for the execution of the second application.

In one or more embodiments, the circuitry 202 may be further configured to transmit, to the second electronic device 304, a user-interface (UI) element associated with the second application. The UI element may be configured to install or update the second application on the second electronic device 304.

In one or more embodiments, the circuitry 202 may be further configured to receive a second user-input from the second electronic device 304 to update the second application. The circuitry 202 may generate a third program code based on the generated second program code, the received second user-input, and the second capability information. The circuitry 202 may be configured to update the second application based on the generated third program code. The circuitry 202 may be further configured to transmit the updated second application to the second electronic device 304. The updated second application may be executed on the second electronic device 304 to provide the first service. The circuitry 202 may be further configured to re-train the neural network model 104 based on the second user-input, the second capability information and the updated second application for the second electronic device 304.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A server, comprising:
  a memory configured to store a trained neural network model to provide a first application associated with a first service, wherein the first application is executable on a first electronic device associated with first capability information; and
  circuitry coupled with the memory, the circuitry is configured to:
    receive, from a second electronic device different from the first electronic device, second capability information associated with the second electronic device;
    generate a second program code based on the received second capability information of the second electronic device and a first program code associated with the first application;
    generate a second application associated with the first service based on the generated second program code; and
    transmit the generated second application to the second electronic device, wherein the generated second application is executed on the second electronic device to provide the first service on the second electronic device.

2. The server according to claim 1, wherein the circuitry is further configured to re-train the neural network model based on the second capability information and the generated second application for the second electronic device.

3. The server according to claim 1, wherein the circuitry is further configured to perform at least one of a code inspection, a unit test, an integration test, or a system test to generate the second application based on the generated second program code.

4. The server according to claim 1, wherein the first capability information associated with the first electronic device and the second capability information associated with the second electronic device includes information about at least one of hardware capability or software capability.

5. The server according to claim 4, wherein the hardware capability includes at least one of an image content rendering capability, an audio content rendering capability, a closed caption capability, a size of a display screen, a resolution of the display screen, a processor speed, a size of storage device, a hardware architecture, a type of input device, a network capability, a type of in-built sensor, a battery capacity, or a power of audio device.

6. The server according to claim 4, wherein the software capability includes at least one of a type and a version of operating system (OS), a programming language, security settings, a version of web browser, a communication protocol, or a current application version related to the first service.

7. The server accordingly to claim 1, wherein the circuitry is further configured to update the first program code of the first application based on the second capability information to generate the second application for the second electronic device.

8. The server accordingly to claim 7, wherein the circuitry is further configured to update a first programming language of the first program code of the first application based on a second programming language indicated by the second capability information, to generate the second application for the second electronic device, wherein the second electronic device supports the second programming language.

9. The server accordingly to claim 1, wherein a number of first features in the first application associated with the first service is higher or lower than a number of second features in the generated second application, based on the first capability information of the first electronic device and the second capability information of the second electronic device.

10. The server according to claim 1, wherein the circuitry is further configured to:
  receive, from the second electronic device, a first user-input indicative of a media content type associated with the first service;
  generate the second program code based on the received first user-input and the received second capability information; and
  generate the second application associated with the first service based on the generated second program code.

11. The server according to claim 1, wherein the circuitry is further configured to:
  determine a set of configuration values for at least one setting of the second electronic device based on the second capability information; and
  transmit, to the second electronic device, the determined set of configuration values for the execution of the second application.

12. The server according to claim 1, wherein the circuitry is further configured to transmit, to the second electronic device, a user-interface (UI) element associated with the second application, and wherein the UI element is configured to install or update the second application on the second electronic device.

13. The server according to claim 1, wherein the circuitry is further configured to:
  receive a second user-input from the second electronic device to update the second application;
  generate a third program code based on the generated second program code, the received second user-input, and the second capability information;
  update the second application based on the generated third program code; and
  transmit the updated second application to the second electronic device, wherein the updated second application is executed on the second electronic device to provide the first service.

14. The server according to claim 13, wherein the circuitry is further configured to re-train the neural network model based on the second user-input, the second capability information and the updated second application for the second electronic device.

15. A method, comprising:
  in a server:
    storing a trained neural network model to provide a first application associated with a first service, wherein the first application is executable on a first electronic device associated with a first capability information;
    receiving, from a second electronic device different from the first electronic device, second capability information associated with the second electronic device;
    generating a second program code based on the received second capability information of the second electronic device and a first program code associated with the first application;
    generating a second application associated with the first service based on the generated second program code; and
    transmitting the generated second application to the second electronic device, wherein the generated second application is executed on the second electronic device to provide the first service on the second electronic device.

16. The method according to claim 15, further comprising re-training the neural network model based on the second capability information and the generated second application for the second electronic device.

17. The method according to claim 15, wherein the first capability information associated with the first electronic device and the second capability information associated with the second electronic device includes information about at least one of hardware capability or software capability.

18. The method according to claim 15, further comprising updating the first program code of the first application based on the second capability information, to generate the second application for the second electronic device.

19. The method according to claim 15, wherein a number of first features in the first application associated with the first service is higher or lower than a number of second features in the generated second application, based on the first capability information of the first electronic device and the second capability information of the second electronic device.

20. A non-transitory computer-readable medium having stored thereon, computer-executable instructions that when executed by a server, causes the server to execute operations, the operations comprising:

storing a trained neural network model to provide a first application associated with a first service, wherein the first application is executable on a first electronic device associated with first capability information;

receiving, from a second electronic device different from the first electronic device, second capability information associated with the second electronic device;

generating a second program code based on the received second capability information of the second electronic device and a first program code associated with the first application;

generating a second application associated with the first service based on the generated second program code; and transmitting the generated second application to the second electronic device, wherein the generated second application is executed on the second electronic device to provide the first service on the second electronic device.

* * * * *